F. R. CORNWALL.
ADJUSTABLE BRAKE HEAD.
APPLICATION FILED JAN. 10, 1910.

959,466.

Patented May 31, 1910.

WITNESSES

INVENTOR

UNITED STATES PATENT OFFICE.

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

959,466.      Specification of Letters Patent.    Patented May 31, 1910.

Application filed January 10, 1910. Serial No. 537,140.

*To all whom it may concern:*

Be it known that I, FREDERICK R. CORNWALL, a citizen of the United States, residing at St. Louis, Missouri, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1:
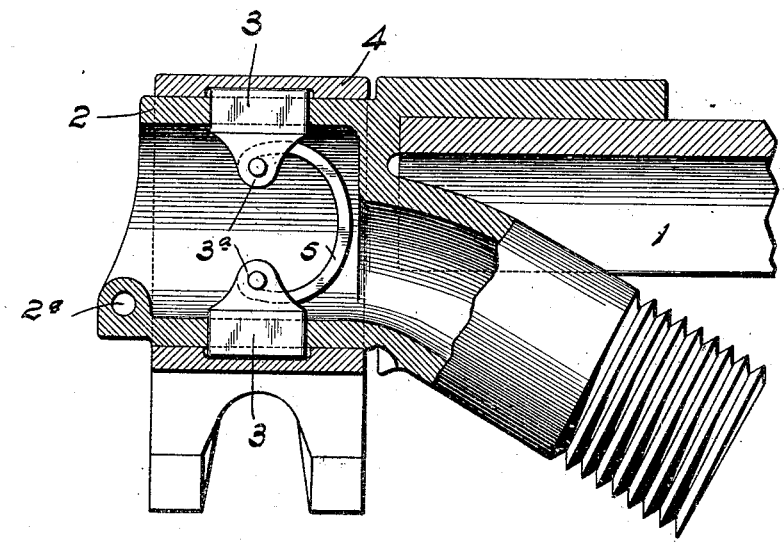
Figure 2:
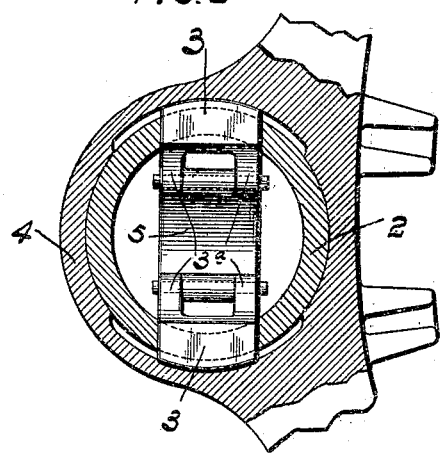
Figure 3:
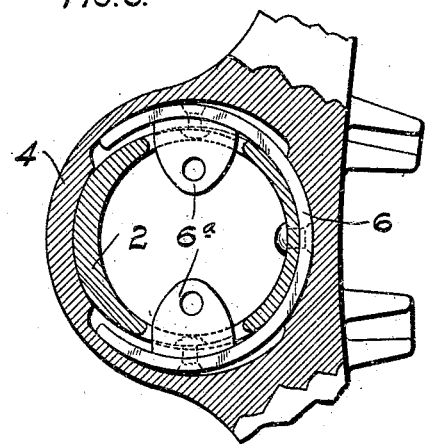
Figure 4:
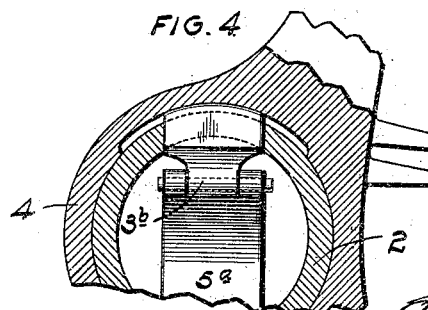
Figure 5:
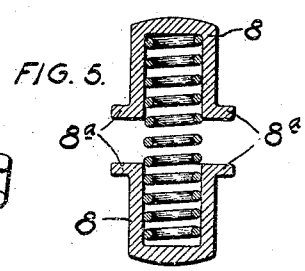

Figure 1 is a longitudinal sectional view through my improved adjustable brake head. Fig. 2 is a cross sectional view through the same. Figs. 3 and 4 are cross sectional views of modified forms. Fig. 5 is a detail view of another modified form.

This invention relates to a new and useful improvement in adjustable brake head, the object being to construct the parts so that the friction blocks, which hold the brake head in adjusted positions, may be retracted, so that the head may be removed from the beam without necessitating a quarter turn thereof.

In the drawings 1 indicates the compression number, and 2 the thrust block which has an inwardly extending threaded projection for the attachment of the tension member not shown. This thrust block is made hollow, the outer end thereof being open.

3 are friction blocks extending through the walls of the thrust block and engaging in grooves in the socket of the brake head 4. These grooves disappear on each side of the thrust block, so that by giving the brake head a quarter turn, it may be withdrawn from the beam. However, when the brake head is in normal position, the friction blocks in the grooves prevent the displacement of the head. Usually, it is considered desirable to employ an additional securing means in the form of a cotter pin, not shown, but which may be passed through the opening 2$^a$.

In some trucks, the space in which the brake head operates, is too small to permit the brake head being quarter turned to remove it from the beam, and in order to retract the friction blocks so that they will release the head to permit its longitudinal withdrawal, I preferably provide recesses in, or projections on, the blocks, whereby they may be forced inwardly by a tool or instrument introduced from the outside.

According to the construction shown in Figs. 1 and 2, the C-shaped spring 5, whose expansive properties hold the friction blocks outwardly in engagement with the sleeve, is formed with eyes at its reduced ends which are received between two lugs 3$^a$ of the friction blocks. There is a space above and below these eyes between lugs 3$^a$, in which space the noses of pliers, pincers, or any suitable implement may be inserted for the purpose of retracting the blocks.

In Fig. 3, a C-shaped spring 6 is arranged in a groove in the outer periphery of the thrust block, and there are perforated projections 6$^a$ extending into the open-ended hollow of said thrust block, in the perforations of which may be inserted the noses of pincers or pliers for retracting the ends of spring 6 which act as friction faces to hold the head in position.

In Fig. 4, each thrust block is provided with a single lug 3$^b$ for coöperating with a bifurcated end of the C-shaped spring 5$^a$. This construction is similar to that shown in Figs. 1 and 2.

In Fig. 5, a coiled spring is shown, the ends of said coiled spring being inserted in recesses in the friction blocks 8 which are provided with lugs 8$^a$ on their inner ends for engagement by a tool or instrument for retracting them.

I claim:

1. The combination of an adjustable brake head, a pair of friction blocks coöperating therewith, and means whereby said friction blocks may be retracted so as to release said head.

2. The combination of an adjustable brake head, a part of a brake beam on which said head is mounted, friction blocks mounted in said part, said part having a space into which the ends of said friction blocks extend, said projecting ends being provided with means whereby said blocks may be retracted.

3. The combination of an adjustable brake head, a recessed part of a brake beam on which the same is mounted, friction blocks carried by said part, and means arranged in said recess for forcing said friction blocks in contact with said brake head to hold it in adjusted positions, and means whereby said friction blocks may be retracted out of engagement with said head.

4. The combination of an adjustable brake head, a recessed part of a brake beam on which the same is mounted, friction blocks carried by said recessed part, a spring in said recess coöperating with said friction blocks to force them outwardly in opposite directions to hold the brake in adjusted positions, and means whereby said friction blocks may be retracted out of engagement with said head.

5. The combination of an adjustable brake head having circumferentially disposed grooves in its socket of the part of a brake beam on which the said head is mounted, a plurality of friction blocks arranged in said part, means for pressing said friction blocks outwardly, and means whereby said friction blocks may be retracted out of engagement with said head.

6. The combination of an adjustable brake head, a part on which the same is mounted, a friction block arranged in said part for holding said head in adjusted positions, and means whereby said friction blocks may be retracted out of engagement with said head.

In testimony whereof I hereunto affix my signature in the presence of two witnesses, this 8th day of January, 1910.

FREDERICK R. CORNWALL.

Witnesses:
M. P. SMITH,
L. CORRAO.